| United States Patent [19] | [11] | 4,396,742 |
|---|---|---|
| Binsack et al. | [45] | Aug. 2, 1983 |

[54] THERMOPLASTIC POLYESTER MOULDING COMPOSITIONS HAVING IMPROVED TOUGHNESS

[75] Inventors: Rudolf Binsack, Krefeld; Christian Lindner, Cologne; Dieter Rempel, Leverkusen, all of Fed. Rep. of Germany

[73] Assignee: Bayer Aktiengesellschaft, Leverkusen, Fed. Rep. of Germany

[21] Appl. No.: 310,148

[22] Filed: Oct. 9, 1981

[30] Foreign Application Priority Data

Oct. 16, 1980 [DE] Fed. Rep. of Germany ....... 3039114

[51] Int. Cl.³ ...................... C08L 67/02; C08L 51/00
[52] U.S. Cl. ....................................... 525/64; 525/279
[58] Field of Search ............................. 525/64, 73, 67

[56] References Cited

U.S. PATENT DOCUMENTS

| 3,925,510 | 12/1975 | Ide et al. | 525/73 |
|---|---|---|---|
| 4,081,422 | 3/1978 | Cordes et al. | 525/67 |
| 4,254,011 | 3/1981 | Bier | 525/64 |
| 4,267,286 | 5/1981 | Campbell | 525/64 |
| 4,283,326 | 8/1981 | Charles et al. | 525/64 |
| 4,342,846 | 8/1982 | Silberberg | 525/64 |

*Primary Examiner*—Wilbert J. Briggs, Sr.
*Attorney, Agent, or Firm*—Connolly and Hutz

[57] ABSTRACT

Grafted polyacrylates having a specific composition improve the impact strength under multi-axial stress of thermoplastic polyesters.

7 Claims, No Drawings

THERMOPLASTIC POLYESTER MOULDING COMPOSITIONS HAVING IMPROVED TOUGHNESS

This invention relates to high-impact resistant mixtures of thermoplastic, saturated polyesters of aromatic dicarboxylic acids and aliphatic or cycloaliphatic diols together with grafted acrylates having a specific composition.

Thermoplastic polyesters have acquired significance in the field of fibres and also in the field of moulding compositions by virtue of their valuable technological properties, for example rigidity, hardness, abrasion-resistance, dynamic strength and heat-resistance. This applies, in particular, to partially crystalline thermoplastic polyesters, for example, polyethylene terephthalate, poly-(1,4-butylene terephthalate), poly-(1,4-cyclohexyl methylene terephthalate). One disadvantage of these moulding compositions lies in their frequently inadequate impact strength in the event of multiaxial stressing.

Numerous proposals have been made with a view to increasing the toughness of thermoplastic polyesters by the incorporation of other polymers, particularly those based on modified elastomers and polyolefins. However, the proposed measures are attended by the disadvantage that the improvement in toughness is accompanied by a significant deterioration in other properties, for example those mentioned above. In addition, multiaxial impact strength is not achieved to the required extent either.

German Offenlegungsschrift No. 24 44 584 describes high-impact resistant moulding compositions having increased oxidation and UV-stability and improved shrinkage behaviour consisting of linear, saturated polyesters and graft copolymers in which the graft copolymer is prepared by grafting essentially styrene and/or esters of methacrylic acid onto a prepolymer based on an acrylate and a monomer containing two unconjugated olefinic double bonds.

German Offenlegungsschrift No. 27 26 256 describes the improvement of the impact strength of polyalkylene terephthalates by certain multistage acrylic polymers in which the first stage is an elastomeric stage obtained by polymerising a monomer system of an alkyl acrylate, a crosslinking monomer and a graft-crosslinking monomer, whilst the final stage is a rigid thermoplastic stage polymerised in the presence of the first elastomeric stage. The publications mentioned above mention nothing about the impact strength of the described moulding compositions in the event of multiaxial stressing, although this is particularly important so far as the production of impact-stressed housing parts is concerned.

The present invention provides moulding compositions having improved impact strength in the event of multiaxial stressing comprising:

(A) from 65 to 99% by weight, preferably from 70 to 98% by weight and, more particularly, from 75 to 97% by weight (based on components A+B) of a saturated polyester of an aromatic dicarboxylic acid and an aliphatic or cycloaliphatic diol, and (B) from 1 to 35% by weight, preferably from 2 to 30% by weight and, more particularly, from 3 to 25% by weight (based on components A+B) of a graft product of (I) from 5 to 55% by weight, preferably from 10 to 40% by weight and, more particularly, from 15 to 35% by weight (based on components I+II) of styrene and/or acrylonitrile and/or methyl methacrylate as the monomers to be grafted on, and (II) from 45 to 95% by weight, preferably from 60 to 90% by weight and, more particularly, from 65 to 85% by weight (based on components (I+II) of an elastomer as the graft base, characterised in that the elastomer II has been obtained by the crosslinking copolymerisation of a mixture of from 99.01 to 99.95% by weight (based on the elastomer II) of an acrylic ester of a $C_1$–$C_8$-alcohol and from 0.05 to 0.99% by weight (based on the elastomer II) of a cyclic monomeric compound which contains at least three ethylenically-unsaturated groups having the same polymerisation velocity.

The moulding compositions according to the invention show outstanding impact strength in the event of multiaxial stressing, even where the proportion of the graft product B is relatively small and where the molecular weight of the polyester is relatively low.

Graft products B in the context of the present invention are particulate polymers which may be obtained by the aqueous emulsion, graft copolymerisation of a monomer or monomer mixture (I) in the presence of an elastomer (II) in the concentration ratios indicated.

The elastomer (II) must be crosslinked acrylate rubber, particularly a crosslinked polymer of an acrylic ester of a $C_1$–$C_8$-alcohol or a corresponding copolymer containing up to 40% by weight of other vinyl monomers, such as styrene, acrylonitrile, methyl methacrylate and vinyl ester.

Suitable acrylic esters include in particular methyl, ethyl, butyl and hexyl acrylate. The acrylic esters may be used either individually or in admixture with one another.

Polyfunctional monomers may be copolymerised for crosslinking the elastomer (II). These monomers, used in accordance with the invention, are cyclic compounds which contain at least three ethylenically-unsaturated groups polymerising at the same velocity. Triallyl cyanurate, triallyl isocyanaurate, trivinyl cyanurates, triallyl benzenes, trivinyl benzenes and 1,3,5-triacryloyl hexahydro-s-triazine are preferred; nitrogen-containing monomers, such as triallyl cyanurate and triallyl isocyanurate for example, being particularly preferred.

The quantity of crosslinking monomers in the elastomer (II) is relatively small and amounts to between 0.05 and 0.99 by weight and, more particularly, to between 0.1 and 0.6% by weight based on the elastomer (II).

The elastomer (II) consists of particles having a mean particle diameter, $d_{50}$, of from 0.1 to 1 μm and preferably from 0.2 to 0.7 μm and has a gel content of at least 60% by weight and preferably of at least 70% by weight.

The mean particle diameter, $d_{50}$, is the diameter above which and below which 50% by weight of the particles lie. It may be determined by ultracentrifuge measurements (W. Scholtan, H. Lange, Kolloid. Z. and Z. Polymere 250 (1972), (782–796) or by electron microscopy, followed by particle counting (G. Kämpf, H. Schuster, Angew. Makromolekulare Chemie 14, (1970), 111–129) or by light diffusion measurements.

The gel content of the elastomer (II) is determined at 25° C. in dimethyl formamide (M. Hoffmann, H. Krömer, R. Kuhn, Polymeranalytik I and II, Georg Thieme Verlag, Stuttgart, 1977).

In addition to the acrylic ester, the elastomer II may contain other copolymerisable monomers, particularly vinyl monomers, such as styrene, acrylontrile, methyl methacrylate, butyl methacrylate, vinyl esters, α-methyl styrene and acrylamides. The proportion of these comonomers amounts to at most 40% by weight, based on the elastomer (II).

The monomers (I) to be grafted on to the elastomer (II), namely styrene, acrylontrile and/or methyl methacrylate, may be graft-copolymerised either individually or even in admixture. It is preferred to use methyl methacrylate or mixtures of styrene and acrylonitrile in weight ratios of from 90:10 to 50:50 and preferably from 80:20 to 60:40, based on the monomers (I).

The graft products B may be obtained by the aqueous emulsion graft polymerisation of from 5 to 55% by weight, preferably from 10 to 40% by weight and, more particularly, from 15 to 35% by weight (based on components I+II) of graft monomer (I) onto from 45 to 95% by weight, preferably from 60 to 90% by weight and, more particularly, from 65 to 85% by weight of elastomer (II).

This polymerisation reaction may be carried out as follows:

The monomers of elastomer (II) are first polymerised in emulsion in known manner in the presence of radical-forming initiators such that particles are formed having a mean particle diameter $d_{50}$ of from 0.1 to 1 μm and a gel content of at least 60% by weight. The monomer mixture may be introduced either continuously or semi-continuously into the polymerisation system either at the beginning of or during the polymerisation reaction.

After formation of the latex of elastomer (II), the graft monomers (I) may be introduced into the latex and copolymerised in emulsion to form the graft products B.

In addition to the actual graft copolymers, free polymers or copolymers of the monomers (I) are also generally formed to a certain extent during this graft copolymerisation reaction which is normally carried out in the presence of radical initiators, emulsifiers, complex formers and regulators. In the context of this invention, therefore, graft products B are understood to be the sum of the actual graft copolymers and the free homopolymers and copolymers.

The graft products B may be isolated from the latex initially obtained in known manner, for example by coagulation with electrolytes, followed by purification and drying.

In the context of this invention, saturated polyesters are defined herein as the condensation products of aromatic dicarboxylic acids (or derivatives thereof) and aliphatic or cycloaliphatic diols, particularly polyalkylene terephthalates, which may be obtained in known manner from terephthalic acid (or derivatives thereof) and alkylene diols or cycloalkylene diols containing from 2 to 10 carbon atoms (cf. for example Kunststoff-Handbuch, Vol. VIII, pages 695 et seq., Carl-Hanser-Verlag, Munich, 1973 and the publications cited therein). Preferred polyalkylene terephthalates are polyethylene terephthalate and poly-(1,4-butylene terephthalate). Instead of the terephthalic acid component, the polyalkylene terephthalates may also contain up to 10 mole percent of another dicarboxylic acid component (aromatic and/or aliphatic and/or araliphatic dicarboxylic acid) and, instead of the diols predominantly used (ethylene glycol or 1,4-butane diol), up to 10 mole percent of other diols (aromatic and/or aliphatic and/or araliphatic diols). In addition, the thermoplastic polyesters may be branched by carboxylic acids or polyols containing more than two reactive groups.

A basic requirement governing the use of the saturated polyesters is that they should have a sufficiently high molecular weight as characterised by an intrinsic viscosity of from 0.5 to 2.0 dl/g, preferably from 0.6 to 1.5 dl/g and, more particularly, from 0.7 to 1.3 dl/g, as measured in a mixture of phenol and o-dichlorobenzene (50–50% by weight) at 25° C. using an Ubbelohde viscometer.

The polyester moulding compositions according to the present invention may contain standard additives, such as lubricants and mould-release agents, nucleating agents, stabilisers, fillers and reinforcing materials, flameproofing agents and dyes.

The filled and reinforced polyester moulding compositions may contain up to 60% by weight, based on the moulding composition, of a filler and/or reinforcing material. Preferred reinforcing materials are glass fibres. Preferred fillers, which may also have a reinforcing effect, are glass beads, mica, silicates, quartz, talcum, titanium dioxide and wollastonite.

The moulding compositions according to the invention may be treated with flameproofing agents, in which case they contain flameproofing agents in a quantity of up to 30% by weight, based on the moulding composition. It is possible to use any known flameproofing agents, for example polyhalogen diphenyl, polyhalogen diphenyl ether, polyhalogen phthalic acid and its derivatives and polyhalogen polycarbonates, the corresponding bromine compounds being particularly effective. In addition, they generally contain a synergist, for example antimony trioxide.

The moulding compositions according to the invention may be prepared in standard mixing units, such as mixing rolls, kneaders, single-screw and multi-screw extruders. Twin-screw extruders are particularly suitable. In their case, the two components A and B may be fused and homogenised together or the graft product B may be worked into the melt of polyester A. It is particularly preferred to work at temperatures from 10° C. to 80° C. above the melting point of the polyester.

In one advantageous process, a mixture of from 35 to 95% by weight and preferably from 50 to 90% by weight (based on components A+B) of graft product (B) and from 5 to 65% by weight and preferably from 10 to 50% by weight (based on components A+B) of polyester (A) is prepared in a first step in one of the above-mentioned mixing units and the resulting mixture is further processed with more polyester (A) in a second step to form the moulding compositions according to the invention.

Even with small proportions of graft product (B), the polyester moulding compositions according to the invention show considerably improved impact strength in the event of multiaxial stressing, even where the polyesters have relatively low molecular weights. Their flow line strength is excellent as is their dimensional stability under heat and their resistance to ageing in hot air.

Commensurate with this property spectrum, the moulding compositions according to the invention may be used for injection moulding and extrusion in any applications requiring good multiaxial impact strength in conjunction with high dimensional stability under heat and high resistance to ageing in hot air, for example in the manufacture of components used under the bonnet of motor vehicles and in the manufacture of temperature-stressed household appliances.

EXAMPLES

1. Production of the graft products B
   (a) Production of the latex of elastomer (II)
      Solution 1: 1610 parts by weight of water; and 3.8 parts by weight of emulsifier[1].
      Solution 2: 233 parts by weight of n-butyl acrylate and; 0.35 part by weight of triallyl cyanurate
      Solution 3: 210 parts by weight of water; and 4 parts by weight of potassium persulfate.
      Solution 4: 1413 parts by weight of n-butyl acrylate; 2.35 parts by weight of triallyl cyanurate
      Solution 5: 1120 parts by weight of water; and 14 parts by weight of emulsifier[1]
      Solution 6: 7700 parts by weight of water; 30 parts by weight of potassium persulfate
      Solution 7: 9000 parts by weight of n-butyl acrylate; 14.4 parts by weight of triallyl cyanurate.
      Solution 8: 8500 parts by weight of water; 70 parts by weight of emulsifier[1]

[1]Na-sulfonates of $C_{14}$-$C_{18}$-hydrocarbons

The polymerisation reactor is freed from oxygen before polymerisation is started. Solutions 1 and 2 are introduced into the reactor and heated to 65° C. Polymerisation is then initiated by the addition of solution 3. Solutions 4 and 5 are then run into the reactor over a period of 4 hours. After polymerisation for 1 hour at 65° C., solution 6 is introduced into the reactor at 65° C., followed by the introduction of solutions 7 and 8 over a period of 5 hours. Polymerisation is then continued for 4 hours at 65° C.

A latex having a particle size of 336 nm (as determined by light diffusion measurements) is obtained. The polymer (elastomer II) has a gel content (in dimethyl formamide) of 83.6% by weight.

(b) Production of the graft products B

Graft product, type C
   The following components are introduced into a reactor:
      Solution 9: 3544 parts by weight of the latex of Example 1a; and 560 parts by weight of water.
   After heating to 65° C., polymerisation is initiated by the addition of
      Solution 10: 820 parts by weight of water; and 12 parts by weight of potassium persulfate.
   The following solutions are then introduced into the reactor over a period of 5 hours at 65° C.
      Solution 11: 356 parts by weight of acrylonitrile; and 920 parts by weight of styrene.
      Solution 12: 1600 parts by weight of water; and 35 parts by weight of emulsifier (see Example 1a)
   Graft polymerisation is then carried out for 3 hours at 65° C.

Graft product, type D
   Solution 13: 5649 parts by weight of the latex of Example 1a, is introduced into a reactor. After heating to 65° C., polymerisation is initiated by the introduction of
   Solution 14: 800 parts by weight of water; and 6 parts by weight of potassium persulfate.
   The following solutions are then introduced into the reactor over a period of 5 hours at 65° C.;
      Solution 15: 142 parts by weight of acrylonitrile; and 366 parts by weight of styrene.
      Solution 16: 870 parts by weight of water; and 20 parts by weight of emulsifier (cf. Example 1a)

Polymerisation is then completed over a period of 3 hours at 65° C.

The graft products types C and D are coagulated by the addition of electrolyte and/or acid. After filtration, the resulting powders are dried in vacuo at 70° C.

2. Production of comparison graft products

Graft product, type E
A copolymer of n-butyl acrylate and the acrylic acid ester of tricyclodecenyl alcohol with graft branches of 75% by weight of styrene and 25% by weight of acrylonitrile (according to German Offenlegungsschrift No. 24 44 584).

Graft product, type F
A copolymer of a graft base of
   69.45 parts by weight of n-butyl acrylate;
   0.35 part by weight of 1,3-butylene diacrylate; and
   0.28 part by weight of allyl methacrylate and a graft covering of
   19.95 parts by weight of methyl methacrylate; and
   9.97 parts by weight of allyl methacrylate (according to German Offenlegungsschrift No. 27 26 256).

3. Preparation of the mixtures

The following polyesters were fused in a continuous twin-screw extruder (Werner & Pfleiderer type ZSK 32):

Type G: poly-(1,4-butylene terephthalate) having an intrinsic viscosity of 0.95 dl/g[1]
Type H: poly-(1,4-butylene-terephthalate) having an intrinsic viscosity of 1.15 dl/g[1]
Type J: polyethylene terephthalate having an intrinsic viscosity of 0.80 dl/g[1]

[1]as measured in an Ubbelohde-viscometer in phenol/o-dichloro benzene (1:1 part by weight) at 25° C.

The graft product B was introduced into the polyester melt through a second feed sprout. Blanketing with nitrogen is advisable. The graft product B was homogeneously dispersed in the melt. It can be advantageous to degas the melt before it emerges from the die. The cylinder temperatures were selected such that melt temperatures of 255° C. and 275° C. were respectively guaranteed in the case of poly-(1,4-butylene terephthalate) and polyethylene terephthalate. The melt strand of the mixture of polyester and graft products was cooled in water, granulated and dried. Standard small test bars (according to DIN 53 453) and squares measuring 3×60×60 mm were injection-moulded from the granulate in a standard injection-moulding machine at the following processing temperatures:
   poly-(1,4-butylene terephthalate) mixture:
   melt temperature 260° C.
   mould temperature 80° C.
   polyethylene terephthalate mixture:
   melt temperature 275° C.
   mould temperature 140° C.

Tests were conducted to determine impact strength and notched impact strength (in accordance with DIN 53 453), ball indentation hardness (in accordance with DIN 53 456), dimensional stability under heat according to Vicat (in accordance with DIN 53 460) and impact strength in the event of multiaxial stressing by the EKWA test (in accordance with DIN 53 443, page 2, impact penetration of a square measuring 3×60×60 mm by a 35 kg weight having a (spherically formed) end 20 mm in diameter dropped from a height of 1 meter). The flow line strength was determined by the tensile test (according to DIN 53 455) using tensile rods joined by injection at both ends. The results are set out in the following Table.

| Example No. | Composition polyester type | Composition polyester % | Composition graft product type | Composition graft product % | $a_k^{(1)}$ KJ/m² | $H_c^{(2)}$ MPa | Vicat B °C | EKWA$^{(3)}$-test W. sec. | EKWA$^{(3)}$-test number of tough fractures % |
|---|---|---|---|---|---|---|---|---|---|
| 1 | G | 95 | C | 5 | 3.0 | 113 | 172 | 85 | 80 |
| 2 | G | 90 | C | 10 | 4.0 | 104 | 166 | 107 | 100 |
| 3 | G | 97 | C | 3 | 3.0 | 119 | 176 | 88 | 80 |
| 4 | G | 95 | D | 5 | 3.5 | 112 | 172 | 109 | 100 |
| 5 | G | 90 | D | 10 | 5.2 | 102 | 165 | 105 | 100 |
| 6 | G | 80 | D | 20 | 11.7 | 81 | 135 | 98 | 100 |
| 7 | G | 70 | D | 30 | 15.4 | 62 | 117 | 91 | 100 |
| 8 | H | 80 | D | 20 | 12.5 | 78 | 136 | 101 | 100 |
| 9 | J | 95 | D | 5 | 3.1 | 130 | 175 | 107 | 80 |
| 10 | J | 90 | D | 10 | 4.6 | 121 | 170 | 104 | 100 |
| Comparison Examples | | | | | | | | | |
| 11 | G | 100 | — | — | 2.3 | 123 | 182 | 15 | 0 |
| 12 | G | 95 | E | 5 | 2.5 | 108 | 171 | 32 | 20 |
| 13 | G | 95 | F | 5 | 2.6 | 109 | 172 | 37 | 30 |

The impact strength test produced the result "unbroken" for the test specimens of all Examples.
The weld line strength$^{(4)}$ amounted to 100% for all the test specimens $^{(1)}$notched impact strength
$^{(2)}$ball indentation hardness
$^{(3)}$EKWA: electronic forth/path recording (elektronische Kraft/Weg-Aufnahme)
$^{(4)}$ $\frac{\text{tensile strength with weld line} \cdot 100}{\text{tensile strength without weld line}}$

We claim:
1. Thermoplastic polyester moulding composition of
(A) from 65 to 99% by weight, based on component (A) plus (B), of a saturated polyester of an aromatic dicarboxylic acid and an aliphatic or cycloaliphatic diol and
(B) from 1 to 35% by weight, based on components (A) plus (B), of a graft product consisting of
(I) from 5 to 55% by weight, based on components (I) and (II), of at least one monomer selected from the group consisting of styrene, acrylonitrile and methyl methacrylate grafted on
(II) from 45 to 95% by weight, based on components (I) and (II) of an elastomer as a graft base characterized in that the elastomer (II) is obtained by the cross-linking copolymerization of a mixture consisting of from 99.01 to 99.95% by weight, based on elastomer (II) of an acrylic ester of a $C_1$–$C_8$-alcohol and from 0.05 to 0.99% by weight, based on elastomer (II) of a cyclic monomeric compound selected from the group consisting of triallyl cyanurate and triallyl isocyanurate.

2. Thermoplastic polyester moulding compositions as claimed in claim 1, characterised in that the cyclic monomer of elastomer (II) contains three unsaturated groups polymerizing at the same velocity.

3. Thermoplastic polyester moulding compositions as claimed in claim 1, characterised in that the graft monomers (I) are mixtures of styrene and acrylonitrile in a ratio by weight of from 90:10 to 50:50.

4. Thermoplastic moulding compositions as claimed in claim 1, characterised in that the polyester is polyethylene terephthalate.

5. Thermoplastic polyester moulding compositions as claimed in claim 1, characterised in that the polyester is poly-(1,4-butylene terephthalate).

6. Thermoplastic polyester moulding compositions as claimed in claim 1, characterised in that the moulding compositions contain up to 60% by weight of glass fibres.

7. Thermoplastic polyester moulding compositions as claimed in claim 1, characterized in that the polyester is a mixture comprising
(a) from 1 to 99% by weight of polyethylene terephthalate and
(b) from 99 to 1% by weight of poly-(butane-1.4-diol terephthalate).

* * * * *